July 26, 1966 R. W. BECKLEY ETAL 3,262,878
METHOD AND APPARATUS FOR CONTINUOUSLY MONITORING WATER BEING
TREATED TO REMOVE TURBIDITY THEREFROM
Filed Dec. 7, 1964 2 Sheets-Sheet 1

ROBERT W. BECKLEY
WILLIAM F. ETTLICH
INVENTORS

BY
BUCKHORN, BLORE, KLARQUIST & SPARKMAN
ATTORNEYS

July 26, 1966  R. W. BECKLEY ETAL  3,262,878
METHOD AND APPARATUS FOR CONTINUOUSLY MONITORING WATER BEING
TREATED TO REMOVE TURBIDITY THEREFROM
Filed Dec. 7, 1964  2 Sheets-Sheet 2
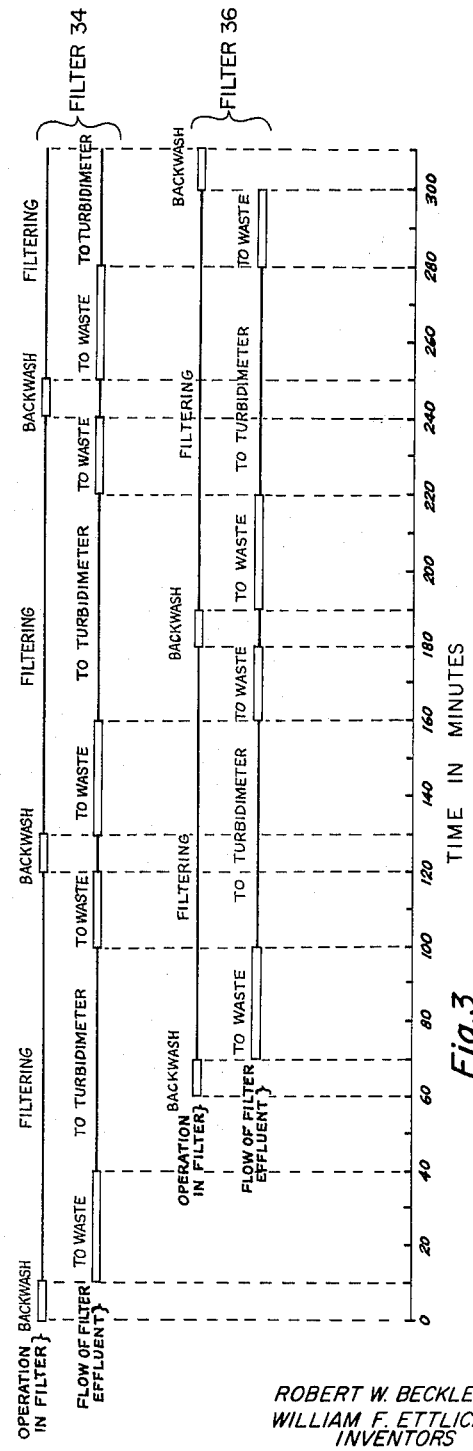
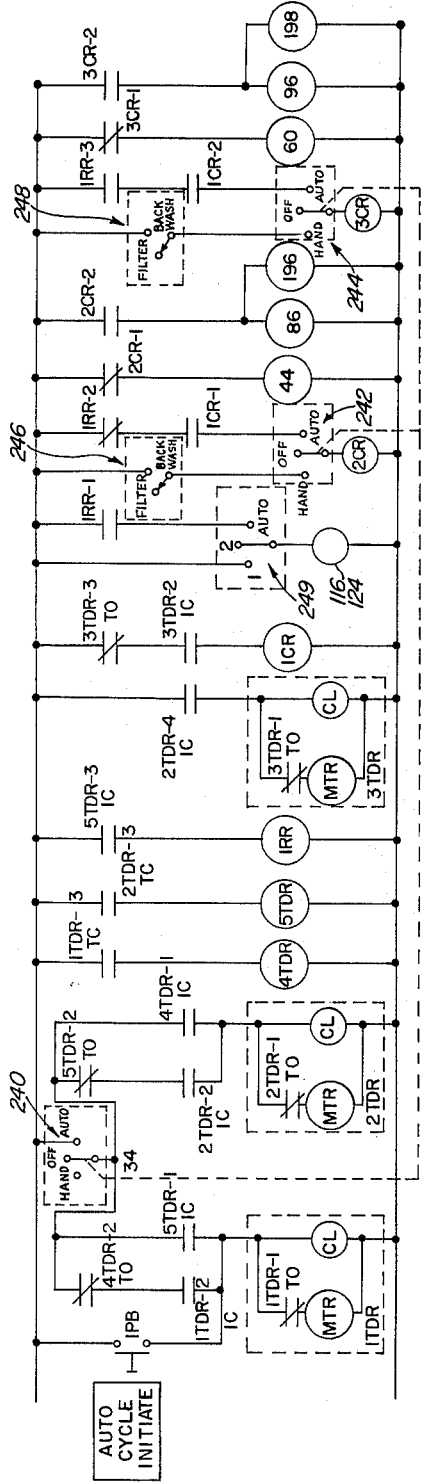
ROBERT W. BECKLEY
WILLIAM F. ETTLICH
    INVENTORS
BY
BUCKHORN, BLORE, KLARQUIST & SPARKMAN
            ATTORNEYS United States Patent Office 3,262,878
Patented July 26, 1966

3,262,878
METHOD AND APPARATUS FOR CONTINUOUSLY MONITORING WATER BEING TREATED TO REMOVE TURBIDITY THEREFROM
Robert W. Beckley and William F. Ettlich, Corvallis, Oreg., assignors to General Service Company, Corvallis, Oreg., a corporation of Oregon
Filed Dec. 7, 1964, Ser. No. 416,240
4 Claims. (Cl. 210—53)

The present invention relates to a water treatment apparatus and method and more particularly to an apparatus and method for monitoring water to be treated so as to determine the amounts of additives necessary to add to such water to clarify the same.

Until rather recently control of the addition of flocculating chemicals to sewage and water in treatment processes was on a more or less qualitative basis in that samples of the water to be treated were drawn off into jars or small containers, the flocculating chemicals added to such samples, and the samples allowed to stand for a period of time and observed visually to determine the nature of the floc which was formed. From such observation adjustments in the addition of the flocculating chemical to the main body of water being treated were attempted. These, necessarily, were qualitative tests and were undesirable in many respects, including the period of time which was required to secure the settling in the so-called "jar test." More recently, a sampling procedure has been described wherein a sample of the water to be treated is withdrawn after the addition of the flocculating chemical, a flocculant aid added to the sample which is then passed relatively rapidly through a filter bed grading from coarse to fine in the direction of flow. The effluent from the filter is monitored to determine the success of the treatment process and coagulant addition adjusted in accordance with the results observed from this sampling. This procedure has been described in Conley et al. U.S. Patent 3,067,133.

It is an object of the present invention to provide improved apparatus of the type shown in the aforesaid patent.

More particularly, it is an object of the present invention to provide automatically operating apparatus for continually withdrawing a sample from water to be treated and monitoring the same to determine the adequacy of the treatment chemicals added thereto.

Another object of the invention is to provide an apparatus for precisely and rapidly determining without the interposition of human judgment, the quantities of clarifying chemicals which should be added to the incoming water in a water treatment plant.

Other objects and advantages of the invention will become more apparent hereinafter.

In accordance with the present invention, a pilot sampling apparatus is provided which comprises a pair of parallel connected filter beds contained in vessels of small diameter so that relatively small samples of water to be tested can be passed through such filter beds. The filters are connected to discharge to a turbidimeter having means to continually monitor the clarity of the water passing therethrough. Valving arrangements and automatic controls are provided alternately to connect the filters to the turbidimeter and alternately to backwash the filters to remove deposited flocculant and sediment therefrom, to restore their filtering capacity so that the water can be continually monitored without the necessity of manual control of any nature.

For a more detailed description of the invention reference is made to the accompanying drawings wherein:

FIG. 4 is a graphical representation of the operating sequence of certain portions of the apparatus; and FIG. 4 is a schematic diagram of a control circuit.

Figure 1:
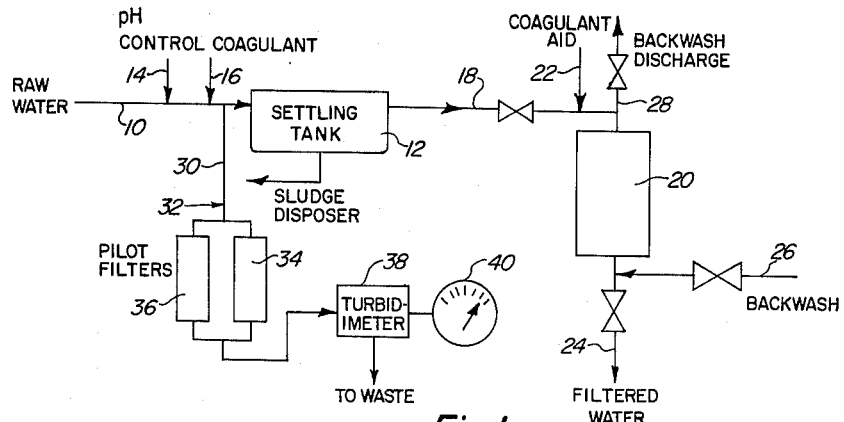
FIG. 1 is a schematic diagram of the lay-out of a water treatment plant utilizing the invention.

Referring now to the drawings, in FIG. 1 there is shown schematically a water treatment plant with which the pilot device of the present invention may be utilized. In such a plant raw water is passed through an intake line 10 to a settling tank 12 with pH control chemicals being added at 14 if necessary, and a coagulant at 16. Such coagulant may be, for example, aluminum sulphate (alum), copper sulphate, ferric chloride, ferric sulphate or ferrous sulphate. The water is retained in the settling tank 12 for a period of time sufficient to permit settling of the floc formed by the addition of the coagulant and the gross solids which may be present in the incoming water, the floc, of course, carrying down much of the turbidity and foreign matter which is present in such water. This period of time may be from a few minutes to several hours. The effluent from the tank 12 is withdrawn through a line 18 and passed to a filter or separation bed 20 comprising particles grading from coarse to fine in the direction of flow. Such a bed may comprise, for example, a lower layer of sand of between about 30 to 80 U.S. mesh sieve size of about 6 to 12 in depth and an upper layer of anthracite coal of between about 10 to 30 U.S. mesh and having a depth of between about 15 to 24 inches. Preferably, however, such bed comprises filter media of at least three different specific gravities grading in size from about 10 to 100 U.S. sieve mesh size and arranged so that there is a continually increasing number of particles in the bed per unit area in the direction of water flow through the bed. Such a bed is more particularly described in the co-pending application of Archie H. Rice and Walter R. Conley, Jr., Serial No. 345,204, filed February 17, 1964. Beds such as are described above are capable of filtering and clarifying water at relatively high filtration rates of from 5 to 8 gallons per minute per square foot. Immediately prior to passing the water into the filter 20 a flocculant or coagulant aid is added as indicated at 22. By coagulant aid is meant both naturally occurring biocolloids and synthetic compounds containing recurring units of small molecular weight chemically combined to form a molecule of large size. Because these compounds have the characteristics of both polymers and electrolytes they are called polymeric electrolytes or polyelectrolytes. Examples of synthetic poly-electrolytes sold commercially are those sold under the trademarks "Separan NP 10," "Separan AP 30" and "Nalco 110." Natural occurring biocolloids include seaweed derivatives, guar gum and ammonium lignosulfonates derived from wood.

The filter 20 is arranged with suitable connections so that the filtered water may be drawn off from the bottom through a line 24 and the filter backwashed periodically as necessary by introducing backwash water through a line 26 and withdrawing it through a line 28. Suitable valves are provided as indicated schematically in the drawings to permit backwashing at the proper time.

It will be apparent that there is considerable lag in the time between the addition of the coagulant prior to its entrance to the settling tank 12 and the discharge of the filtered water at 24. Accordingly, if the water quality is simply monitored at the discharge of the filter 20, changes may occur in the quality of the raw water entering the system for which compensation will be too late. Accordingly, in accordance with the present invention, apparatus is provided which permits rapid monitoring of the water immediately subsequent to the addition of the coagulant at the point 16 to determine whether sufficient amount of coagulant has been added. The rate of addition of coagulant aid to the water remains relatively fixed and need not vary in amount as does the coagulant in order to compensate for changes in the quality of the water as may arise from the result of a rain or mud slide. Seasonal changes in the water, such as the occurrence of snow runoff water from melted snow as compared to summer rain runoff, may require some change in the amount of coagulant aid but during a particular season the amount of coagulant aid added to the water will remain relatively stable. On the other hand, influx of turbid water arising from a heavy rain on the water sheds of the stream from which water is being drawn may require a large increase in the amount of coagulant to be added to the water in order to obtain satisfactory clarification. With the apparatus of the invention, a small amount of raw water is withdrawn from the inlet line 10, immediately following the addition of the coagulant 16, through a sampling line 30. After the addition of coagulant aid as indicated at 32 it is passed alternately through pilot filters 34, 36 which have a filter media bed substantially identical to that contained within the filter 20. The pilot filters 34, 36 are relatively small in diameter so that only a relatively small amount of water need be passed therethrough to obtain a significant result. Following the passage of the water through one of the filters 34, 36 it is passed to turbidimeter 38 in which the turbidity of the water is determined by a suitable measuring device and a turbidity indicated on a read-out device 40. In the alternative, the turbidimeter can be connected with a sensing device for determining the turbidity of the water and with means responsive thereto to control the device adding the coagulant feed at the point 16 so that automatic adjustment of the amount of feed could be made.

Figure 2:
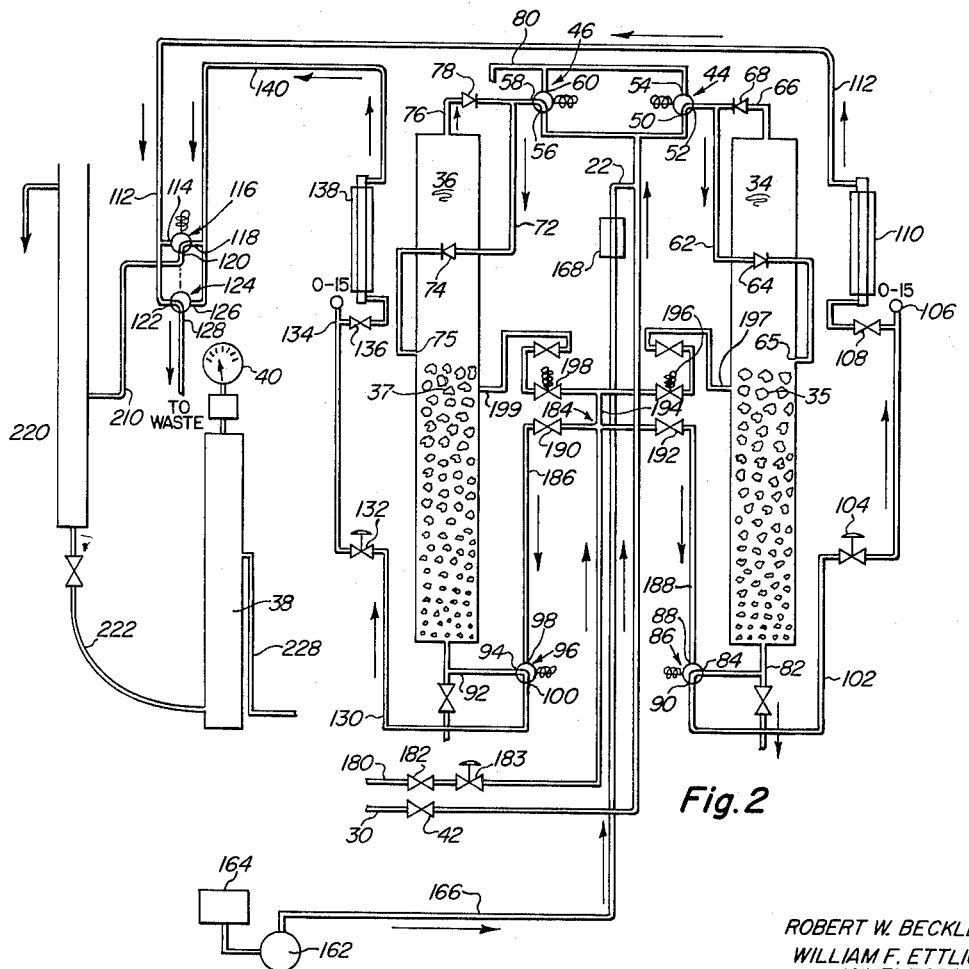
FIG. 2 is a schematic flow diagram of the pilot monitoring system of the invention.

Referring now to FIG. 2, the pilot filters 34, 36 of the invention comprise elongate, tubular vessels having a length substantially greater than the height of the beds of filter media contained therein and indicated at 35 and 37, respectively. For example, the vessels may have a length of about 52 inches and a diameter of between about one and two inches with a media depth of about 30 inches. The water to be monitored is fed to the filters 34, 36 through the inlet line 30, a shut-off valve 42 and a pair of solenoid operated three-way valves 44, 46. The valve 44 is arranged to control the passage of water into the filter 34 and valve 46 to control the passage of water into the filter 36. The valve 44 is provided with three ports 50, 52 and 54. The valve 46 is likewise provided with three ports indicated at 56, 58 and 60. The valve 44 is constructed so that it can be operated to direct flow between the ports 50, 52 or the ports 52, 54, the valve being constructed so that normally ports 50, 52 are connected and upon energization of the valve solenoid ports 52, 54 are connected. The valve 46 is arranged normally to permit flow between the ports 56, 58 and upon energization of the valve solenoid to connect ports 58, 60. The port 52 is connected through a conduit 62 to a port 65 in the vessel of the filter 34 positioned substantially immediately above the level of the filter media 35, the purpose for which will be explained. A check valve 64 is preferably provided in the line 62 to prevent flow from the vessel toward the valve 44. The port 52 is also connected to the top of the vessel of the filter 34 through a line 66 having a check valve 68 therein which permits flow only in the direction of the top of the vessel toward the port 52, and the purpose for which will become apparent. The valve 46 is connected from port 58 by a conduit 72 to the vessel for the filter 36 at a point 75 immediately above the media bed 37 contained in such vessel. Conduit 72 is likewise provided with a check valve 74 preventing flow of fluid from the vessel toward the valve 46. The port 58 is also connected to the top of the vessel of the filter 36 through a conduit 76 having a check valve 78 therein to prevent flow of water from the valve toward the vessel. The ports 54, 60 are both connected to a line 80 through which water may be discharged to waste.

Connected to the bottom of the vessel 34 is a line 82 which is connected to a port 84 of a solenoid operated three-way valve 86 having two additional ports 88, 90. In its normal, de-energized condition, ports 84, 90 of valve 86 are connected. When its solenoid is energized ports 84, 88 are connected. The filter 36 is connected through a discharge line 92 to the port 94 of a three-way valve 96 having additional ports 98, 100. In its normal, de-energized condition ports 94, 100 of valve 96 are connected. When its solenoid is energized ports 94, 98 are connected.

The port 90 of valve 86 is connected to a conduit 102 which leads through a pressure regulator 104, a pressure gauge 106 and a flow control valve 108 to a flow meter 110. From the flow meter 110, the water is lead through a line 112 to a port 114 of a solenoid operated three-way valve 116 which also has ports 118, 120. In its normal de-energized condition, ports 118, 120 are connected. Upon energization of the solenoid of valve 116, ports 114, 120 are connected. The line 112 is also connected to the port 122 of a three-way valve 124 having additional ports 126, 128. The valve 124 is connected for operation from the same solenoid which operates valve 116. In its normal condition, ports 122, 128 are connected. Upon energization of the solenoid, ports 126, 128 are connected.

The port 100 of the valve 96 is connected through a conduit 130 having a pressure regulator 132, a pressure gauge 134 and a flow control valve 136 therein, to a flow meter 138. The flow meter 138 is connected to a further conduit 140 which, in turn, is connected to the port 118 of the valve 116 and port 126 of valve 124.

Means are provided for adding coagulant aid to the water passing into the filters 34, 36 including a pump 162 adapted to draw a solution of the coagulant aid from a source 164 and to deliver the same through a line 166 to a flow regulator 168 discharging through line 32 into the flow line 30 adjacent to valves 44, 46.

Wash water for backwashing the filters 34, 36 is led from a suitable source through a conduit 180 having a shut-off valve 182 and a pressure regulator 183 therein to a cross-connection 184 having a branch line 186 connected to the port 98 of valve 96 and a further branch line 188 connected to the port 88 of the valve 86. Shut-off valves 190, 192 may be provided in the lines 186, 188 respectively. A further branch line 194 is divided, the branches thereof leading to a pair of solenoid operated, normally closed shut-off valves 196, 198. The former is arranged when energized to permit the flow of wash water through a conduit 197 into the vessel of the filter 34 at a point a few inches below the level of the media 35 therein when such media is in its filtering condition, that is, in its settled state. Similarly, the valve 198 is adapted when energized to permit the flow of wash water through a conduit 199 into the vessel of the filter 36 at a point a few inches below the top of the media 37 therein. As will be explained subsequently the wash water may discharge from the filter 34 through the line 66 and from the filter 36 through the line 76.

The port 120 of the valve 116 is connected through a line 210 to the center of an elongate, vertical tube 220 from which water discharges at the bottom through a line 222. The tube 220 is an air removal tube to permit the escape of entrained air in the water entering the same. The line 222 leads to a turbidimeter 38 which may be of any suitable kind and which is provided with a read-out device indicated at 40 for indicating the turbidity of the water being monitored therein. Water is discharged to waste from the turbidimeter 224 through a waste line 228.

The sequence of operation of the apparatus of the invention and a control circuit for obtaining such operation will now be described with reference to FIGS. 3 and 4. Referring first to FIG. 3, the same is a bar graph illustrating the direction of flow of water through each of the filters and the flow of the filter effluent from such filter at any particular time. It should be understood that FIG. 3 represents a portion of the cycle and that the cycle is repeated indefinitely.

FIG. 4 is a so-called "across the line" circuit diagram in which the symbol "TDR" indicates a time delay relay, "CR" a control relay and "RR" a ratchet relay. The illustrated circuit is arranged to permit either hand or automatic operation. The basic operation of the circuitry is determined by three ganged hand-off-automatic switches indicated at 240, 242 and 244, respectively. When the switches are in their hand position, 1TDR and 2TDR are disabled which disables the automatic timing circuits and places relays 2CR, 3CR under hand control. Basic control of the filtering operation by hand is obtained by filter-off-backwash switches 246 and 248, which control the operation of relays 2CR and 3CR.

When switches 240, 242 and 244 are in their automatic position, the automatic cycle may be started by pressing the automatic cycle initiate push button 1PB. This energizes timer 1TDR and contact 1TDR–2 closes, thereby providing power to 1TDR through switch 240 and contacts 4TDR–2 and 1TDR–2. 1TDR continues to time until it has timed out at which time contact 1TDR–3 closes, energizing pneumatic timer 4TDR. When 4TDR is energized contact 4TDR–1 closes, which energizes timer 2TDR. 2TDR then receives power through switch 240 and contacts 5TDR–2 and 2TDR–2. As soon as 4TDR times out, contact 4TDR–2 opens, thereby de-energizing timer 1TDR. When 2TDR picks up contact, 2TDR–4 also closes, energizing 3TDR, and contact 3TDR–2 closes energizing relay 1CR. Contacts 1CR–1 and 2 both close in the circuits to 2CR and 3CR. Only one of the relays will be energized, however, and this will be determined by the ratchet relay contacts 1RR–2 and 1RR–3. If relay 2CR is energized (contact 1RR–2 closed), contact 2CR–1 will open and contact 2CR–2 will close. This will de-energize solenoid valve 44 and energize solenoid valves 86 and 196 to permit flow of water from conduit 180 through such valves and into filter 34 through bottom feed line 82 and the side line 197. This will place filter 34 into backwash operation. If relay 3CR were energized instead, contact 3CR–1 would open and contact 3CR–2 would close. This would de-energize solenoid valve 60 and energize valves 96 and 198 placing filter 36 in backwash. Only one bed, however, will be placed in backwash in any one time as determined by the contacts on ratchet relay 1RR. As soon as 3TDR has timed out contact 3TDR–3 opens, thereby de-energizing relay 1CR and stopping the backwash of the bed 34.

When timer 2TDR times out, contact 2TDR–3 closes energizing 5TDR. When 5TDR is energized contact 5TDR–1 closes energizing timer 1TDR and contact 5TDR–3 closes energizing ratchet relay 1RR. This causes 1RR contacts to change position. Each time the ratchet relay coil is energized the contacts change position. Contact 1RR–1 determines which bed is being monitored by the turbidimeter through solenoid valves 116, 124. The turbidimeter sample can also be selected manually with switch 249. Ratchet relay contacts 1RR–2 and 1RR–3 select the control bed to be backwashed next.

When relay 5TDR times out, timer 2TDR is de-energized through contact 5TDR–2 and 5TDR is then de-energized. The cycle then starts again. Either timer 1TDR or 2TDR is timing at all times during automatic operation. Timer 3TDR operates only when 2TDR is timing.

Referring again to FIG. 3, the sequence of operation will be described again assuming an initial start-up of the filters. Filter 34 is first backwashed for a period of 10 minutes and then water passed therethrough in the filtering direction. For the next 30-minute period the turbidimeter is by-passed and the water discharged through port 128 of valve 124. This permits the filter to condition and to reach a steady-state operation. After a period of 30 minutes, the valves 116, 124 are operated to direct the flow of water from the filter 34 to the turbidimeter and which flow will continue for the next hour. However, after 20 minutes or an hour after the commencement of operation of the filter 34, backwash of the filter 36 is commenced and continued for a period of 10 minutes. At the end of this period the valves of the filter 36 are operated to place the filter in operation, the effluent from the filter 36 being by-passed by the valves 116, 124 to waste. After a further period of 30 minutes, the valves 116, 124 are operated to once again by-pass the effluent from the filter 34 to waste and to direct the effluent from the filter 36 to the turbidimeter. For a period of 20 minutes the effluent from the filter 34 is allowed to discharge to waste and then the valves on the filter 34 are operated to cause backwashing of the filter 34 for a 10-minute period, after which it is placed back into filtering operation and the effluent again discharged to waste for a 30-minute period. At the end of such period, the effluent from the filter 34 is switched to flow to the turbidimeter whereas the flow from the filter 36 is once again discharged to waste. After a 20-minute period, the filter 36 is again switched to backwash for a 10-minute period to complete a cycle and which will continue indefinitely.

It is mentioned above that it was desired to pass backwash water into the filters 34, 36 not only through the bottom thereof but also at a point just below the top of the media beds 35, 37. The purpose of the introduction of water of the latter points is to provide an increased volume and velocity of backwash water in the top portion of the filter beds wherein a majority of the floc and filtered materials will accumulate. This enables more rapid and more complete cleaning of the filter media during backwash.

As will be apparent, the filter media will, in effect, expand during backwash and the purpose of only partially filling the filter vessels with the media is to provide space into which the media may expand during backwash. It will also be observed that upon termination of backwash a considerable head of backwash water will have accumulated in each of the vessels over the top of the media. To avoid the necessity of passing all of such backwash water back through the filter media, the lines 62, 72 which carry the raw water to the filters, preferably, are connected to the ports 65, 75 immediately above the level of the bed. Thus, such raw water upon commencement of filter operation substantially immediately begins to pass through the beds and after slight mixing at the commencement of filtering operation, the water remaining over the filter remains substantially stagnant and is not carried into the filter. This, of course, expedites the conditioning of the filter and stabilizing of the filter operation.

The time cycle of the system can, of course, be varied depending upon the conditions which are encountered. It is desirable, obviously, to backwash the filters at sufficient frequency that no carry through of turbidity is encountered and also with sufficient frequency so as to avoid the accumulation of excessive head loss on either of the filters. In exceptionally turbid water more frequent backwashing may be required or where water is exceptionally clear the filtering operations may be carried out for substantially longer periods of time.

As will be apparent, by following the indications on the readout device 40 of the turbidimeter, the operator of the water treatment plant can vary the addition of the amount of coagulant or other chemicals so as to assure that proper clarification of the water discharging from the filter 20 will be obtained. Instead of utilizing a readout device, a coagulant feed control device could be controlled directly by suitable means from the turbidimeter.

Having illustrated and described a preferred embodiment of the invention it should be apparent to those skilled in the art that it permits of modification in arrangement and detail. We claim all such modifications as come within the scope of the appended claims.

We claim:
1. In a pilot filter arrangement for a water treatment plant,
a pair of filters including a retaining vessel for each,
a first pair of three-way valves, one for each of said filters each having a first, a second and a third port,
first conduit means connecting said first port of one of said first valves to one of said filter vessels and said first port of the other of said valves to the other of said filter vessels for conveying water to be filtered from said valves to the corresponding filter vessel,
a source of raw water to be filtered,
second conduit means connecting said source of raw water to said second of the ports of each of said first valves,
a second pair of three-way valves one for each of said filters each having a first, a second and a third port,
third conduit means connecting the first port of one of said second valves to the bottom of said one of said filter vessels and the first port of the other of said second valves to the bottom of the other of said filter vessels,
a turbidimeter,
a third three-way valve having a first port connected to said turbidimeter and a second and a third port,
a fourth three-way valve having a first port for discharging water therefrom, and a second and a third port,
fourth conduit means connecting said second port of one of said second valves to said second port of said third and fourth three-way valves,
fifth conduit means connecting said second port of the other of said second valves to said third port of said third and fourth three-way valves,
a source of backwash water,
conduit means connecting said source of backwash water to the third port of each of said second three-way valves,
conduit means connecting the top of said one filter vessel to the said first port of said one of said first valves and the top of said other filter vessel to the said first port of said other of said first valves for conveying backwash water from said filter vessels to said first valves,
check valve means in said last mentioned conduit means for preventing flow of water through the same from said first valves to said filter vessels,
and means connecting said third port in each of said first valves to a waste disposal system.

2. In a pilot filter arrangement for a water treatment plant as set forth in claim 1,
a pair of first valve operating means connected one to each of said first three-way valves for alternately interconnecting the said first and second ports thereof and the said first and third ports thereof,
a pair of second valve operating means connected one to each of said second three-way valves for alternately interconnecting the said first and second ports thereof and the said first and third ports thereof,
and control means connected to said valve operating means for operating the same.

3. In a pilot filter arrangement for a water treatment plant as set forth in claim 2 wherein said control means is connected to said valve operating means, for operating the same in the following sequence:
(1) interconnecting the said first and second ports of the said first and second three-way valves connected to said one of said filters and maintaining such connections for a first predetermined period of time thereby to pass said raw water through said one filter,
(2) for a second predetermined period of time commencing with but of lesser duration than said first predetermined period of time interconnecting the first and second ports of said fourth valve and simultaneously interconnecting the said first and third ports of said third valve, thereby to pass the water from said one filter to waste,
(3) at the termination of said second predetermined period of time operating said third and fourth valves to interconnect for a third predetermined period of time said first and second ports of said third valve so as to pass the water from said one filter to said turbidimeter and simultaneously interconnecting the first and third ports of said fourth valve,
(4) at a predetermined time during said first predetermined period of time interconnecting said first and third ports of said first and second valves connected to the other of said filter vessels whereby backwash water may flow upwardly through said other filter vessel and maintaining such interconnections for a fourth predetermined period of time terminating prior to the termination of said first predetermined period of time,
(5) at the termination of said fourth predetermined period of time operating the first and second valves connected to said other filter vessel to interconnect said first and second ports for a fifth predetermined period of time equal in length to said first period thereof whereby said source of raw water is connected to flow through said other filter and through said fourth valve to discharge from the said first port thereof,
(6) at a predetermined time during said fifth period of time operating said third and fourth valves to interconnect the third and first ports of said third valve and the first and second ports of said fourth valve for a sixth predetermined period of time thus to pass water from said other filter to said turbidimeter and to pass water from said first filter to waste,
(7) at the termination of said first period of time operating said first and second valves connected to said one filter to interconnect the first and third ports thereof for a seventh predetermined period of time equal in length to said third period of time thereby passing backwash water upwardly through said one filter,
(8) at the termination of said seventh period of time operating said first and second valves connected to said one filter to interconnect the first and second ports thereof whereby said raw water source is connected once again to said one filter,
(9) at the termination of said sixth period of time operating said third valve to interconnect the first and second ports thereof and operating said fourth valve to interconnect said first and third ports thereof once again to connect said first filter to said turbidimeter,
(10) and repeating said cycle.

4. The method of continuously monitoring water being treated to remove turbidity therefrom which comprises the steps of:
adding an inorganic, flocculating agent to said raw water,
continuously withdrawing a sample of said raw water,
adding coagulant aid to said sample,
passing said sample through a filter for a first predetermined period of time and discharging the sample water from said filter to waste,
after a second predetermined period of time monitoring said sample water discharging from said first filter to determine the turbidity thereof,
after a third period of time continuously withdrawing a second sample from said water being filtered and passing the same through a second filter for a fourth predetermined period of time,
at the end of said fourth predetermined period of time commencing the monitoring of the effluent discharging from said second filter and terminating the monitoring of the sample water discharging from said first filter, after a fifth predetermined period of time backwashing said first filter for a sixth predetermined period of time, at the termination of said sixth predetermined period of time again continuously withdrawing a sample of water and passing the same through said first filter for a seventh predetermined period of time equal to said first predetermined period of time, at the termination of said seventh predetermined period of time commencing the monitoring of water from said first filter and ceasing the monitoring of water from said second filter, after an eight predetermined period of time backwashing said second filter for a ninth predetermined period of time, at the end of said ninth predetermined period of time again continuously withdrawing a sample of said raw water and passing the same through said second filter for a tenth period of time equal to said fourth period, at the end of said tenth period of time commencing the monitoring of water from said second filter and terminating the monitoring of water from said first filter, and repeating the aforesaid cycle.

References Cited by the Examiner

UNITED STATES PATENTS 2,268,607    1/1942    McGill _____ 210—277
2,773,829    12/1956    Hunting _____ 210—80 X
3,067,133    12/1962    Conley et al. _____ 210—54 X

OTHER REFERENCES

Conley et al., Test Program For Filter Evaluation at Hanford, Jour. AWWA, Feburary 1960, vol. 52, pp. 205–218.

MORRIS O. WOLK, *Primary Examiner.*

MICHAEL E. ROGERS, *Examiner.*